Patented Nov. 1, 1938

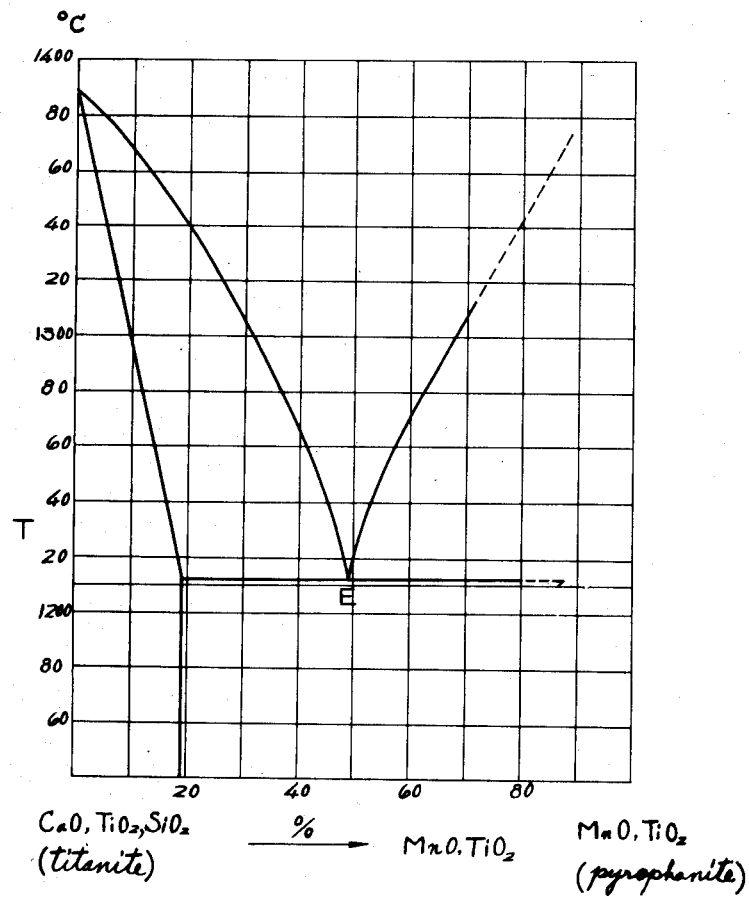

2,135,466

UNITED STATES PATENT OFFICE 2,135,466

TREATMENT OF TITANIUM BEARING IRON ORES OR SPONGY IRON OBTAINED THEREFROM

Keizô Iwasé, Sendai, Japan, assignor to Kinzoku Zairyo Henkyusho (The Research Institute for Iron, Steel and Other Minerals), Sendai, Japan Application October 8, 1937, Serial No. 168,060

3 Claims. (Cl. 75—12)

This invention relates to a process of refining ferro-titanium ores and of smelting spongy iron obtained therefrom and more particularly to a process of producing high grade iron and manganese ilmenite from titanium bearing iron ores and spongy iron by smelting, and its object is to facilitate the treatment and operations and also to provide slags rich in titanium oxide.

Titanium bearing iron ores have been considered unsuitable as industrial raw materials for refining iron or obtaining titanium oxide owing to their poor contents in iron and titanium. In order to utilize such ores for industrial purposes both iron and titanium are necessary to be extracted most economically from the ore.

In refining such ores or spongy iron obtained therefrom by smelting, titanium may be recovered from the slag most economically if it is possible to greatly increase the titanium oxide content in the slag as compared with that of the original ore.

In accordance with this invention, in order to increase the amount of titanium oxide in the slag separated from the ore, coming from the refining process using an electric furnace to produce pig iron or steel directly from the ore or obtained in refining the spongy iron which is obtained from the ore, and also in order to increase the fluidity of the slag, the main charge consisting of a mixture of 40 to 25 weights of calcium oxide and 55 to 35 weights of manganese oxide is added for every 100 weights of titanium oxide in the raw materials, and other various slag forming elements to be added are so regulated that the slag may contain a eutectic mixture of titanite ($CaO.SiO_2.TiO_2$) and pyrophanite ($MnO.TiO_2$) as its main ingredients, and thus the content of titanium oxide in the slag is regulated to be more than 35% and that of manganese oxide to be more than 15%. This slag is called manganese ilmenite as it is rich in $TiO_2$ and MnO.

Referring to the drawing the single figure thereof illustrates characteristic curves of binary system of titanite ($CaO.SiO_2.TiO_2$) and pyrophanite ($MnO.TiO_2$).

In the drawing, temperature T is taken on the ordinate and the abscissa indicates the percentage of the weight ratio of titanite to pyrophanite.

As seen from the drawing, the eutectic point E of the two is about 1210° C. and its composition is as follows:

| | Per cent |
|---|---|
| Silica | 15.3 |
| Calcium oxide | 14.3 |
| Manganese oxide | 23.5 |
| Titanium oxide | 46.9 |

In the well known process of refining iron sand, the melting point of the slag obtained is higher than 1270° C. and it is difficult to lower the melting point below the latter temperature. Even if slag having a lower melting point is obtained, the content of the titanium oxide can never be greater than 20%. Consequently, the poor ores such as iron sand could never be utilized economically in prior arts. As the results of the inventor's investigation for utilizing such low grade ores, the inventor has found out that titanite and pyrophanite constitute a eutectic mixture at 51% of titanite and 49% of pyrophanite and its melting point is as low as 1210° C. The contents of calcium oxide, silica and manganese oxide in the eutectic slag are 37, 38 and 44 respectively in weights for every 100 weights of titanium oxide. A further study has shown that if the slag contains greater than 15% of manganese oxide and greater than 35% of titanium oxide, it does not lose the nature of high fluidity although one or more of the slag forming constituents or fluxes such as, calcium oxide, silica, iron oxide, magnesia, aluminium oxide, vanadium oxide, alkaline oxide, phosphoric anhydride and other fluxes may be added thereto in amount as high as 20% of this eutectic slag. Thus, according to the present process the refining is very much facilitated for industrial purposes, and since the titanium content in the slag is very high the recovering of titanium is very advantageously and economically prosecuted.

The content of titanium oxide in the titanium bearing iron ores is ordinarily about 10%. With this invention, however, the content of titanium oxide in the slag can be greatly increased to as much as 35% or more, it being far greater than that contained in the ore, and the fusing point of the slag is very much lowered to produce high titanium containing slag which makes the treatment easier. Accordingly, the recovering of titanium may be prosecuted economically.

A practical example of this invention is given in the following: Compressed mass of 1 kg. of spongy iron produced from iron sand, (its composition being 5% of silica, 14.3% of titanium oxide and the remainder iron) is heated in a high frequency electric furnace. 30 gm. of pig iron is added thereto and further 70 gm. of manganese oxide and 43 gm. of calcium oxide are put in the furnace and the heating temperature is raised to fuse spongy iron. After adding some de-oxidizing elements thereto, steel is cast. In this case, it is ascertained that the titanium content of the produced steel is 0.05% and almost all of the titanium oxide entered into slag. The slag has high fluidity and can easily be separated from the steel, its total weight being about 300 gm. which coincides approximately with calculation. The content of titanium oxide in the slag is as high as 45% and that of manganese oxide is 20%.

I claim:

1. In the process of separating titanium oxide directly from titanium bearing iron ores by reduction of the iron with carbon and from spongy iron produced from such ores, the step which comprises adding to the iron containing reduction product as fluxes from 40 to 25 parts by weight of calcium oxide and from 55 to 35 parts by weight of manganese oxide for every 100 parts by weight of titanium oxide contained therein and smelting this and regulating the silica content of the charge suitably so that the slag produced constitutes an eutectic mixture of titanite and pyrophanite, thereby producing a slag having a content of titanium oxide higher than 35% and of manganese oxide higher than 15% and having a correspondingly low melting point.

2. The process of separating titanium oxide and silica from spongy iron containing titanium oxide in greater amount and silica in lesser amount which comprises heating the same in an electric furnace together with the addition of sufficient amounts of manganese oxide and calcium oxide to fuse with the titanium oxide and silica and form an eutectic mixture of titanite and pyrophanite having a melting point below 1270° C., substantially as described.

3. The process of making steel from spongy iron containing titanium oxide and silica in an electric furnace which consists in adjusting the amounts of the titanium oxide and silica in the charge in about the proportion of 35 parts by weight of silica to 100 parts of titanium oxide, adding pig iron and slag forming fluxes including manganese oxide and calcium oxide in proportional amounts of from 40 to 25 parts by weight of calcium oxide and from 55 to 35 parts by weight of manganese oxide for every 100 parts by weight of titanium oxide to combine with the titanium oxide and silica when the temperature is sufficient to fuse the iron and thereby produce an eutectic mixture of titanite and pyrophanite having a high fluidity and low specific gravity readily separable from the steel thereby formed.

KEIZÔ IWASÉ.